United States Patent [19]

Oogita

[11] Patent Number: 4,806,745
[45] Date of Patent: Feb. 21, 1989

[54] IC CARD WITH FEWER INPUT KEYS

[75] Inventor: Yoshinori Oogita, Nara, Japan

[73] Assignee: Sharp Kabushiki Kaisha, Osaka, Japan

[21] Appl. No.: 39,087

[22] Filed: Apr. 16, 1987

[30] Foreign Application Priority Data

Apr. 18, 1986 [JP] Japan .............................. 61-59122[U]
Jun. 9, 1986 [JP] Japan .............................. 61-134476
Jun. 17, 1986 [JP] Japan .............................. 61-92800[U]

[51] Int. Cl.⁴ .......................................... G06K 19/06
[52] U.S. Cl. .................................... 235/492; 340/709; 340/712; 340/825.31; 341/20
[58] Field of Search ................ 235/492; 340/709, 712, 340/365 VL

[56] References Cited

U.S. PATENT DOCUMENTS 4,185,281 1/1980 Silverstone ..................... 340/709 X
4,701,601 10/1987 Francini et al. ................. 235/492 X Primary Examiner—David L. Trafton
Attorney, Agent, or Firm—Flehr, Hohbach, Test, Albritton & Herbert

[57] ABSTRACT

An IC card has a preregistered password and a display section which displays numerals and a cursor. An operator enters a password by moving the cursor to the desired numeral and presses a key. Fewer keys are thus required to enter passwords and the surface area of the card can be utilized more efficiently than if use is made of the usual set of ten number keys.

9 Claims, 9 Drawing Sheets

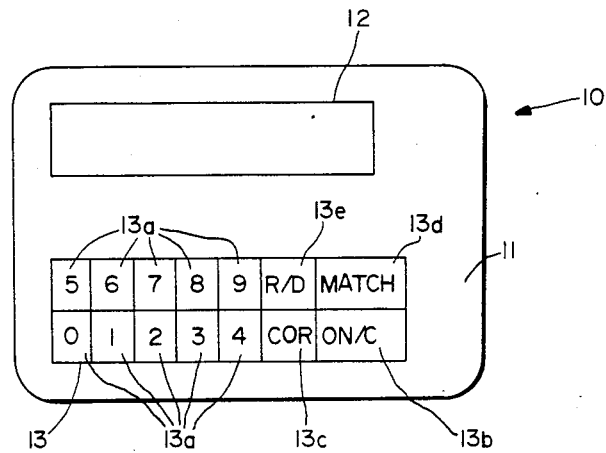
(PRIOR ART)
FIG.—1
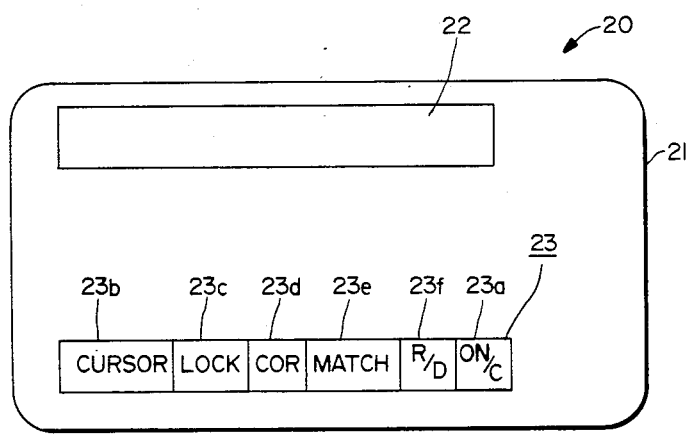
FIG.—2
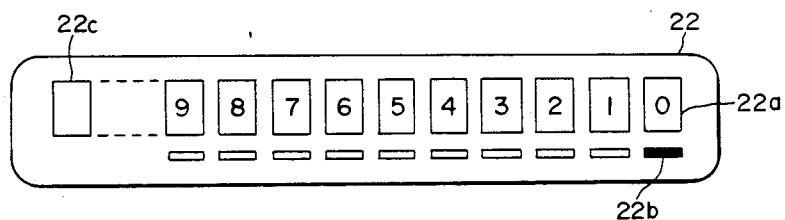
FIG.—3

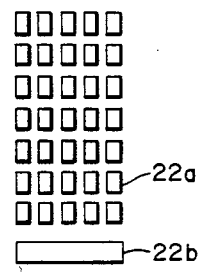
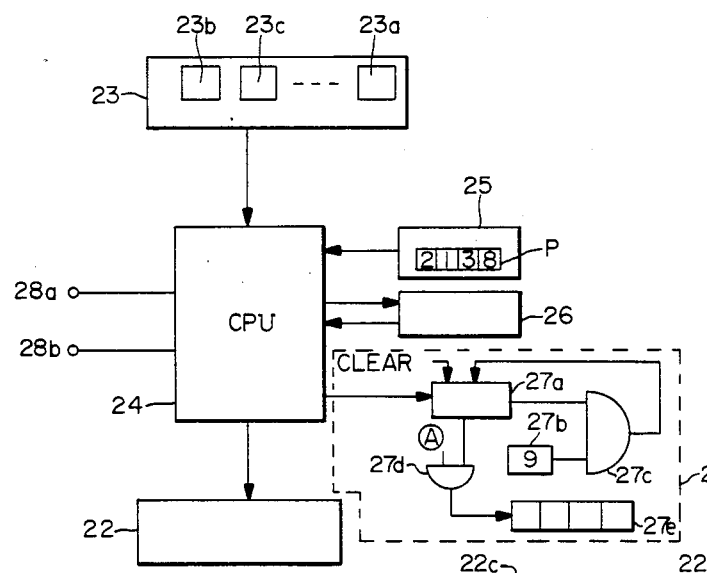
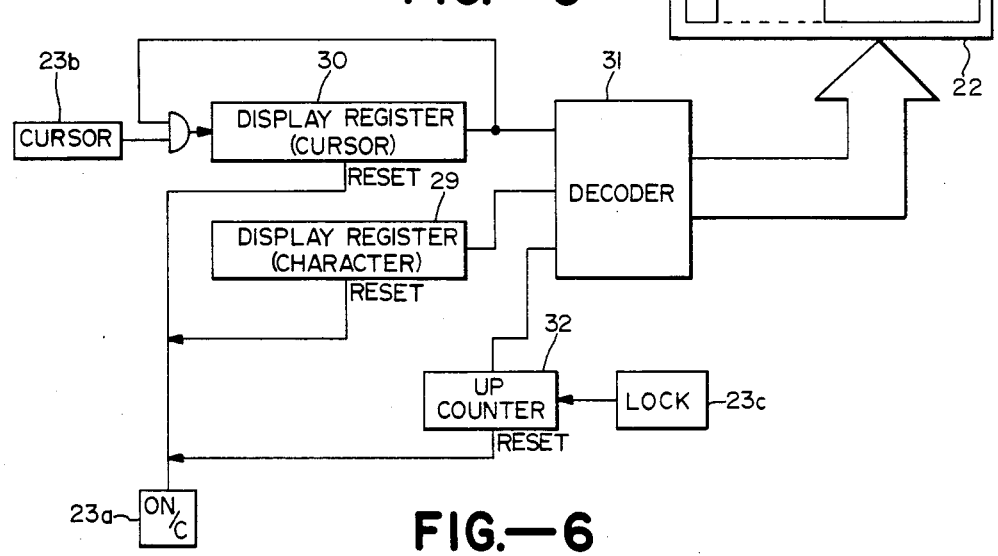

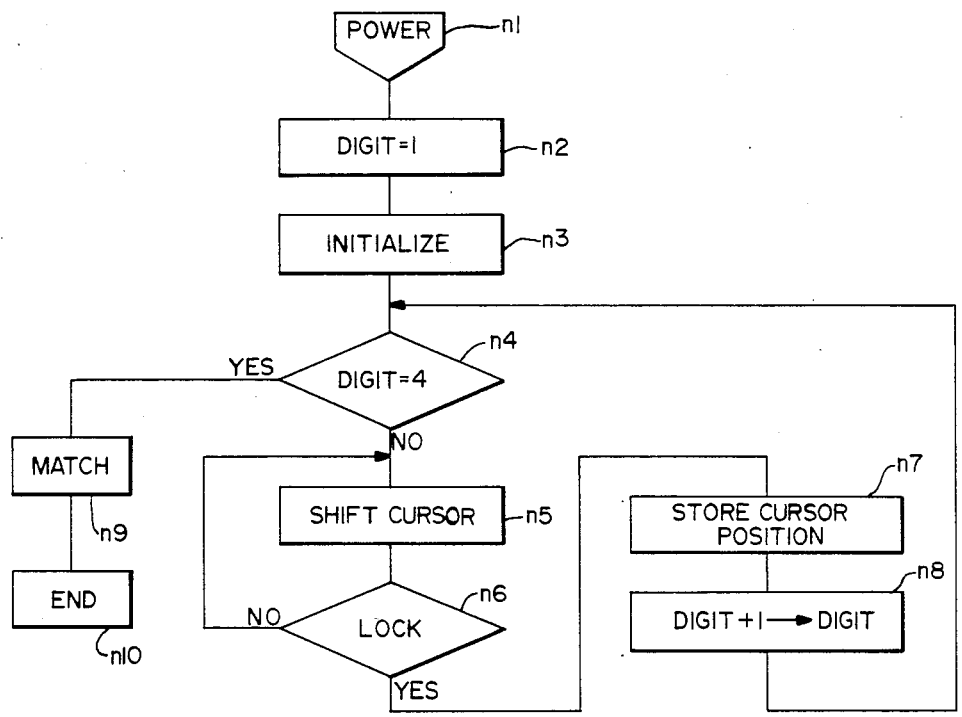
FIG.—7
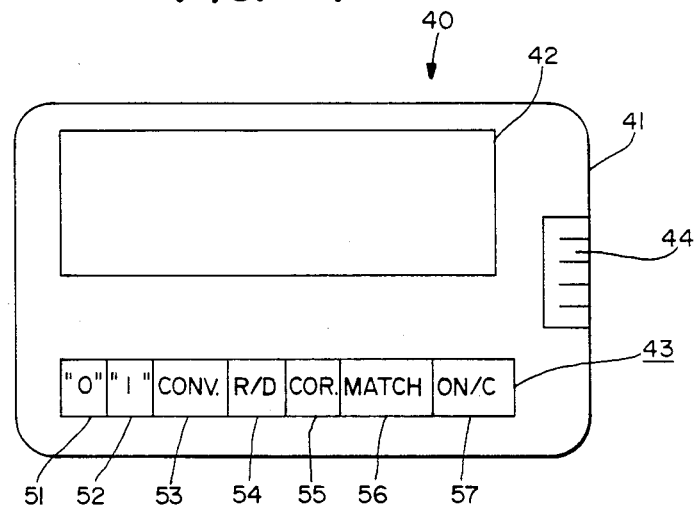
FIG.—8

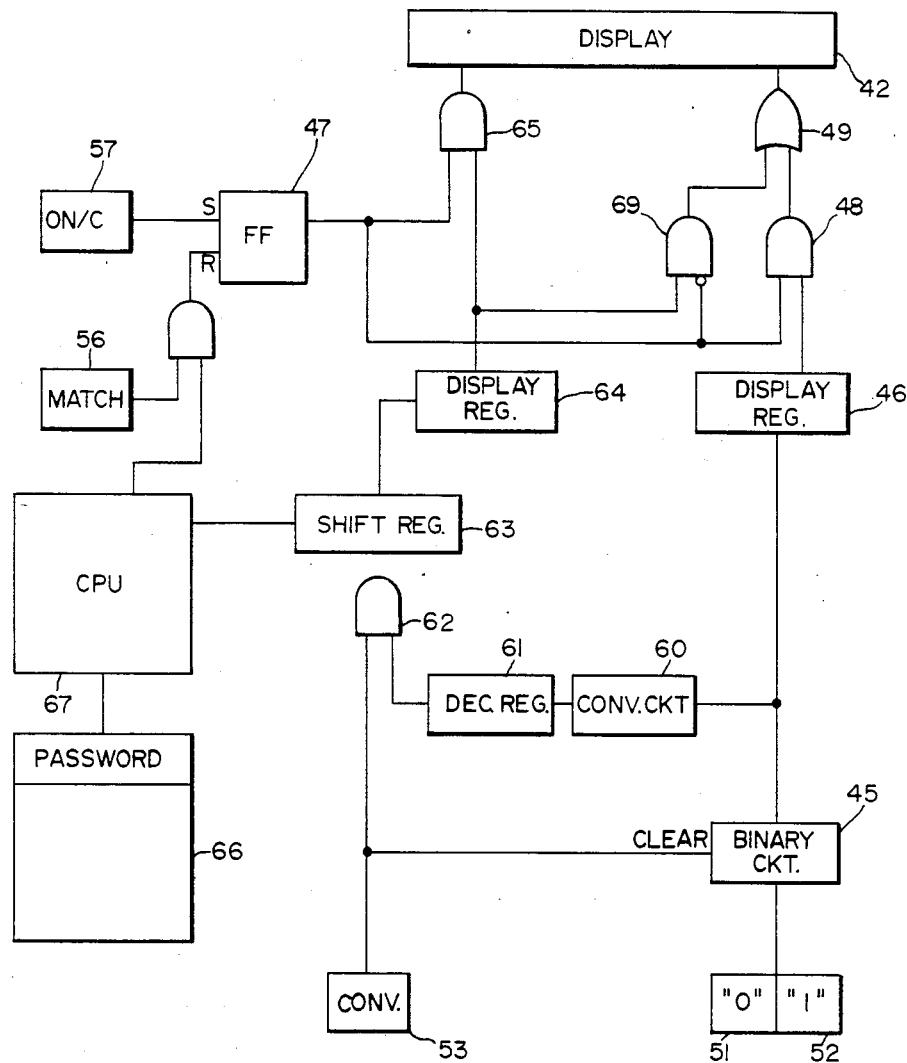
FIG.—9

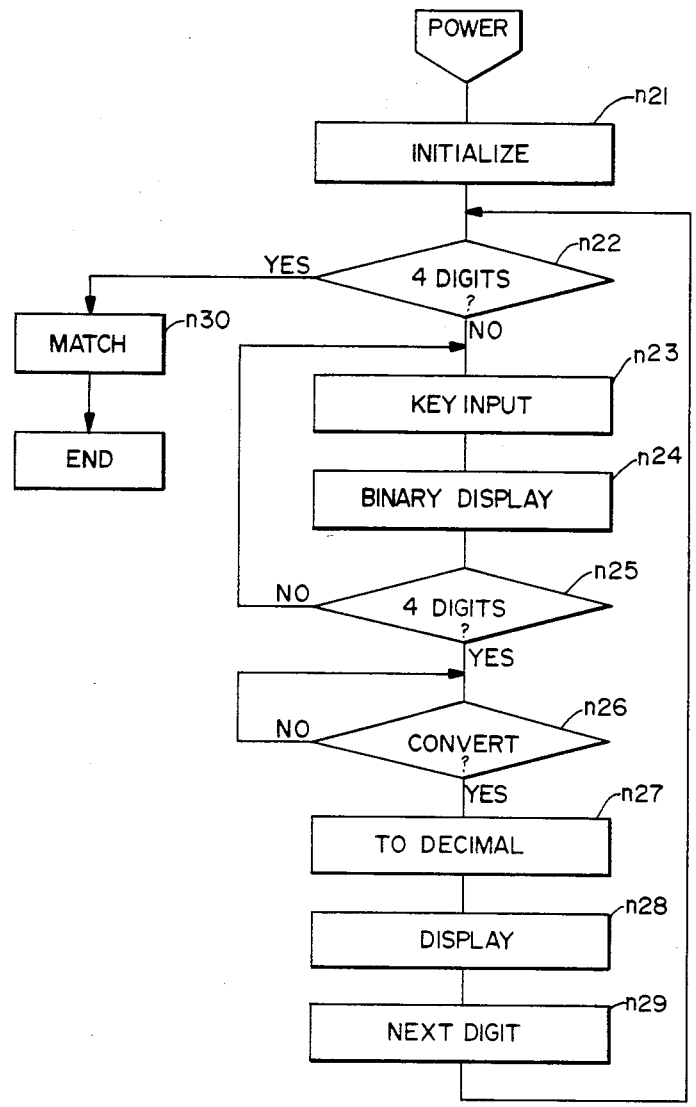
FIG.—10
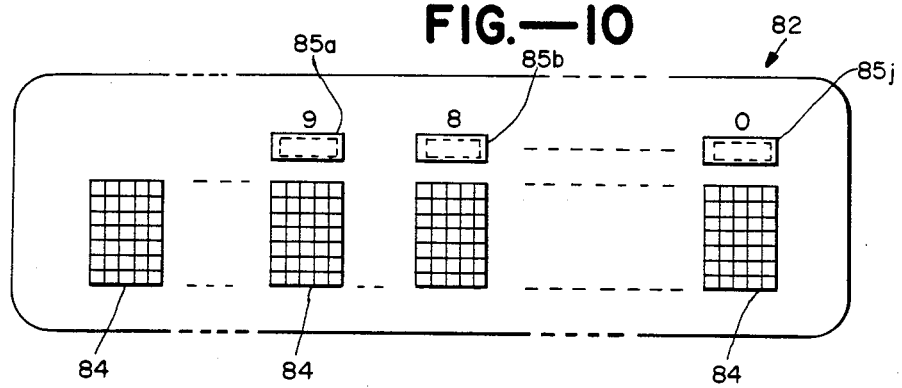
FIG.—11

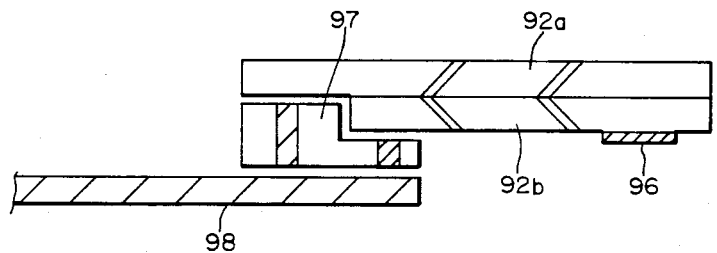
FIG.—12
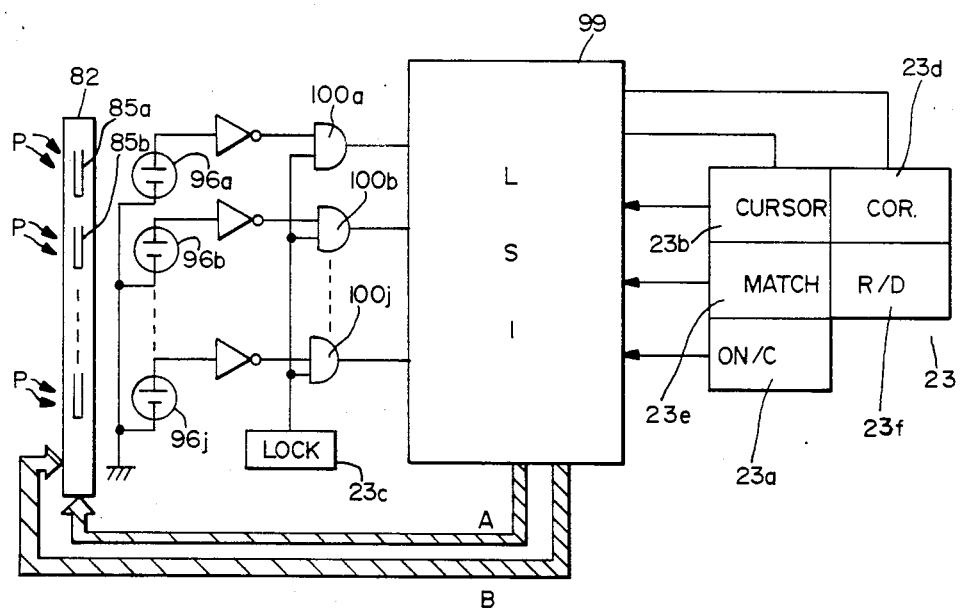
FIG.—13

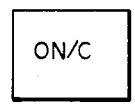 
FIG.—14A
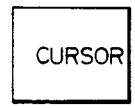 
FIG.—14B
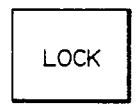 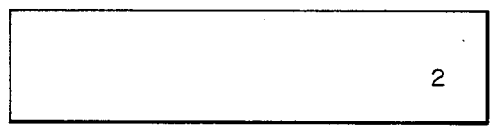
FIG.—14C
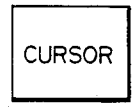 
FIG.—14D
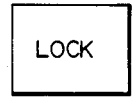 
FIG.—14E

| CURSOR | 3 |
|---|---|
| | 21 |

FIG.—14F

| LOCK | |
|---|---|
| | 213 |

FIG.—14G

| CURSOR | 8 |
|---|---|
| | 213 |

FIG.—14H

| LOCK | |
|---|---|
| | 2138 |

FIG.—14I

| MATCH | PASSWORD | OK |
|---|---|---|

FIG.—14J

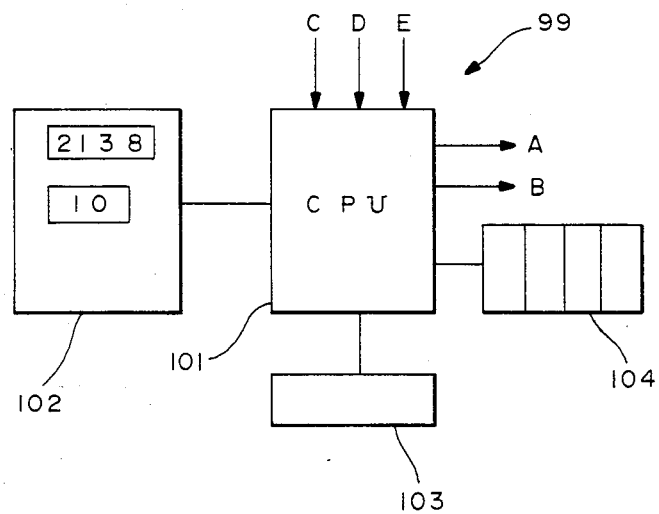
FIG. — 15

IC CARD WITH FEWER INPUT KEYS

BACKGROUND OF THE INVENTION

This invention relates to an IC card with input keys for entering numerical data and a display section for displaying the content of a memory device, and more particularly to such an IC card with an improved input section having fewer keys.

Memory cards such as credit cards are used in various areas including bank and other financial operations. Memory cards of the most common type are formed by attaching a magnetic memory medium such as a magnetic tape onto a plastic card. More recently, IC cards are made with an active element such as an IC circuit buried inside such that not only can the owner's personal data be freely written therein or read therefrom but also stored data can be securely protected. As shown in FIG. 1, such an IC card 10 is typically comprised of a main body 11, a display section 12 on the main body 11 for displaying the content of a memory device (not shown), a key input section 13 for entering input data such as a password and a connecting terminal (not shown) for connecting the card 10 with an external apparatus. The IC card 10 of FIG. 1 may be used as a cash card, a personal identification card, or even a passport. For such a purpose, the key input section 13 may include, as shown, ten number keys 13a, a power key ON-C 13b which also serves as an all-clear key, a correction key COR 13c for making corrections on the information which has been entered, a match key 13d for checking the correctness of entered information such as a password and a read/display key R/D 13e for reading out stored information. In order to enter a password "2138" into such an IC card, for example, the user first presses the power key 13b and then the number keys "2", "1", "3", and "8" sequentially such that displays "0", "2", "21", "213", and "2138" appear sequentially in the display section 12. In order to check whether a correct password has been entered, the match key 13d is operated.

A prior art IC card of the type shown in FIG. 1 requires as many as 14 keys. In order to cram them within its surface of 85.5×54 mm in area, the individual keys are made extremely small and they are difficult to operate. If the portion of the surface area taken up by the key input section 13 is unreasonably increased, however, it becomes difficult to find an area for placing the display section 12. Since the card must remain thin, LSI circuit parts, etc. cannot be placed where the keys are provided and it becomes difficult to set various electronic parts of the IC card other than the input keys. Moreover, IC cards with a large number of input keys are expensive to manufacture.

SUMMARY OF THE INVENTION

It is therefore an object of the present invention to provide an IC card with fewer input keys.

It is another object of the present invention to provide an IC card with easily operable input keys.

The above and other objects of the present invention are achieved by providing an IC card with the number of input keys reduced by 2. The card includes on its surface a display section where the usual ten numerals from 0 to 9 as well as a cursor are displayed such that the user can move this cursor to select and form a desired number (that is, a numeric sequence). In another aspect, the present invention relates to an IC card into which a binary password can be entered by operating only two keys (say, a "0"-key and a "1"-key) such that the input binary password is converted into a decimal number and is compared with a preliminarily stored password.

BRIEF SUMMARY OF THE DRAWINGS

The accompanying drawings, which are incorporated in and form a part of the specification, illustrate embodiments of the present invention, and together with the description serve to explain the principles of the invention. In the drawings:

FIG. 1 is a plan view of a prior art IC card,
FIG. 2 is a plan view of an IC card embodying the present invention,
FIG. 3 is a display made in the display section of the IC card of FIG. 2,
FIG. 4 is a drawing for showing the arrangement of display segments,
FIG. 5 is a block diagram of the IC card of FIG. 2,
FIG. 6 is a detailed block diagram of the display section,
FIG. 7 is a flow chart of a key input operation on the IC card of FIG. 2,
FIG. 8 is a plan view of another IC card embodying the present invention,
FIG. 9 is a block diagram of the IC card of FIG. 8,
FIG. 10 is a flow chart of the operation of the IC card of FIG. 8,
FIG. 11 is a plan view of a display section embodying the present invention,
FIG. 12 is a sectional view of a part of the display section of FIG. 11,
FIG. 13 is a block diagram of an IC card incorporating the display section shown in FIGS. 11 and 12,
FIGS. 14(a) through 14(j) show keys which are pressed and displays which are made in an exemplary operation of the IC card of FIG. 13, and
FIG. 15 is a block diagram of the LSI circuit shown in FIG. 13.

DETAILED DESCRIPTION OF THE INVENTION

With reference to FIG. 2, an IC card 20 embodying the present invention is comprised of a main body 21, a display section 22 and an input key section 23. This card 20 is characterized as having no number keys included in the input key section 23. Instead, the input key section 23 includes, besides those described above in connection with FIG. 1 such as a power key 23a which also serves as an all-clear key, a read/display key 23f, a match key 23e, and a correction key 23d, a cursor key 23b for moving a cursor and a lock key 23c for determining the cursor position The cursor and lock keys 23b and 23c are used for entering a password as explained below.

When the power key 23a is operated (pressed), the display section 22 displays ten numerals from 0 to 9 22a and a cursor 22b. The cursor 22b is initially at a position for indicating the numeral "0" but moves to the next position to the left every time the cursor key 23b is pressed thereafter. If the cursor key 23b is pressed after the cursor 22b has reached the position for indicating the numeral "9", the cursor 22b returns to the initial position to indicate "numeric 0" again.

If the user presses the lock key 23c after moving the 22b as explained above to a position responding to a desired numeral, this desired numeral is entered as the first (highest) digit of the input password. The procedure described above is repeated the same number of times as the number of digits in the password.

With reference to FIG. 2, the correction key 23d is for making correction after a numerical input has been made erroneously. The match key 23e is for comparing the password thus entered with that assigned to and stored in the card. The read/display key 23f is pressed when it is desired to read data stored in the card 20 after it is determined that a correct password has been entered. Numeral 22c of FIG. 3 indicates a display indicator for indicating which digit of the password is being entered, or the number of numerical data which have been entered. It shows "0" when the card is initialized and the displayed numeral increases by 1 each time the aforementioned lock key 23c is pressed. FIG. 4 shows how display segments are arranged for displaying each of the numerals 22a and its corresponding cursor 23b. According to a typical embodiment, the numerals 22a are each displayed on a 5×7 dot matrix and each cursor 22b is represented by a bar.

The internal structure of the IC card 20 of FIG. 2 is explained below by way of the block diagram of FIG. 5 wherein components explained above such as the display section 22 are indicated by the same numerals. Numeral 24 indicates a central processing unit (CPU). Whenever one of the keys in the input key section 23 is pressed, a corresponding key signal is received by the CPU 24. The CPU 24 is also connected to a read only memory (ROM) 25 and a random access memory (RAM) 26. The ROM 25 stores not only an operating program for the CPU 24 but also a password P. FIG. 5 shows that the password P is a 4-digit number "2138" in this example. The RAM 26 serves to store data received by the CPU 24 through an input terminal 28a. If the input password formed in the input key section 23 and transmitted to the CPU 24 matches the password P stored in the ROM 25, the aforementioned data stored in the RAM 26 are transmitted under the control of the CPU 24 to an external apparatus connected to the IC card 20 through an output terminal 8b.

Numeral 27 indicates a holding section which serves to temporarily hold a password received from the key input section 23. Numeral 27a indicates a counter which is cleared when the power key 23a is pressed, its content increasing by 1 each time the cursor key 23b is pressed thereafter. The number stored in this counter 27a is the same as the number 22a that is displayed in the display section 22. This counter 27a is connected to an AND gate 27c together with a memory 27b storing "9". When the content of the counter 27a reaches 9, increasing one by one as explained above, the AND gate 27c transmits a signal and clears the counter 27a.

When the lock key 23c is pressed, the CPU 24 transmits a control signal indicated by A (in FIG. 5) which passes through another AND gate 27d and stores in a shift register 27e the number which become stored in the counter 27a when the lock key 23c was pressed, that is, the number 22a specified by the cursor key 23b and the lock key 23c. A 4-digit password entered through the input key section 23 becomes thus stored in the shift register 27e after the aforementioned process is repeated a total of four times. If the match key 23e is pressed thereafter, the CPU 24 operates to compare the stored password P in the ROM and the input password 9 now stored in the shift register 27e of the holding section 27.

Reference is made next to FIG. 6 wherein numerals defined above again indicate the corresponding components. When the power key 23a is pressed, both a character display register 29 and a cursor display register 30 are reset and a decoder 31 connected to these registers 29 and 30 transmits a signal to display the initial condition in the display section 22. If the cursor key 23b is pressed thereafter, the content of the cursor display register is shifted and the cursor 22b is moved correspondingly. When the lock key 23c is pressed, a signal is received by an up-counter 32, the content of which is displayed in the digit display means 22c and is increased by 1.

The operation described above is explained next by way of the flow chart of FIG. 7. When the power switch 23a is pressed (n1), "1" is stored in the up-counter (n2) and various components are initialized (n3) as explained above. Four digits of a password are thereafter entered. Each time the cursor key 23b is pressed, the cursor 22b moves to the left except when it moves from "9" to "0" (n5). If the lock key 23c is pressed (n6), the position of the cursor, or the number specified by the cursor 22b is stored as the entry number (n7). Consideration is then given to the next digit (n8) and this continues on until all four numerals of the password are stored (n4).

When all four digits are entered and the match key 23e is pressed, the password thus entered is compared with the stored password (n9) and the program ends (n10). If the matching reveals that the input password is correct, the CPU 24 continues to carry out the data processing.

The relationship between the key operations described above and the displays made in the display section 22 is as follows: When the power key 23a is pressed, the cursor 22b appears below "0". Next, the cursor key 23b is pressed to move the cursor to the position below the numeral "2". In the meantime, "1" is displayed in the display indicator 22c because the first digit of the password is being entered. Then, the cursor key 23b is operated again until the cursor moves to the position corresponding to the numeral "1" and the lock key 23c is pressed to enter "1" as the second digit of the input password. This time, the digit display means 22c displays "2" in the meantime. The third and fourth digits of the password are similarly entered by operating the cursor and lock keys 23b and 23c.

The description given above is intended to be illustrative rather than limitative. Instead of displaying a cursor and moving it to indicate a series of numerals, the program may be so written as to cause each indicated numeral to blink. In summary, an IC card described above requires only two keys to select a number and this means that the total number of keys to be placed on the card can be reduced significantly and that its surface space can be used more efficiently. A reduced number of keys also means that the manufacturing cost of the card can be reduced and that input of numerals can be effected more easily.

FIG. 8 illustrates another IC card 40 embodying the present invention. The card 40 is comprised of a main body 41, a display section 42 for displaying the contents of a memory device (not shown), etc. a key input section 43 for entering a password, etc. and connecting terminals 44 for connecting the card 40 to an external apparatus, and is characterized as having a "0"-key 51 for entering binary number "0", a "1"-key for entering binary number "1" 52 and a conversion key 53 for converting a binary number into a decimal number, in addition to keys of the types described above in connection with the IC card of FIG. 2 such as a read/display key 54, a correction key 55, a match key 56 and a power key 57 which also serves as an all-clear key.

The system structure of the IC card 40 of FIG. 8 is shown by the block diagram of FIG. 9 wherein components shown in FIG. 8 and described above such as the display section 42 are indicated by the same numerals as indicated above. With reference to FIG. 9, a binary register 45 is for the purpose of storing binary data received through the aforementioned "0"-key 51 and the "1"-key 52, and a display register 46 is provided for displaying the output of this binary register 45 in the display section 42. Numeral 47 indicates an RS flip-flop which is set when the power key 57 is pressed. The output signals from the RS flip-flop 47 and the binary register 45 are received by an AND gate 48 which serves to display the content of the binary register 45 in the display section 42 through an OR gate 49. The output from the binary register 45 is also received by a binary-to-decimal conversion circuit 60 for converting binary data stored in the binary register 45 into decimal data and its output is received by a decimal register 61 adapted to store the decimal number obtained from the binary-to-decimal conversion circuit 60. Numeral 62 indicates another AND gate for transmitting the contents of the decimal register 61 to a shift register 63 when the conversion key is pressed. Numeral 64 indicates another display register for displaying the content of the shift register 53 in the display section 42. Numeral 65 indicates still another AND gate for displaying the content of the display register 64 in the left-hand four digits of the display section 42 with an output from the RS flip-flop 47. Numeral 66 indicates a memory device for storing a password in decimal form. Numeral 67 indicates a central processing unit (CPU) which serves to compare the content of the shift register 63 with the password stored in the memory device 66. Numeral 68 indicates still another AND gate for transmitting a reset signal to the RS flip-flop 47 when the match key 56 is pressed and the content of the shift register 63 is found by the CPU 67 to match the password stored in the memory device 66. Numeral 69 indicates still another AND gate for displaying the content of the display register 64 in the display section 42 through the OR gate 49 when the RS flip-flop 47 is in the reset condition.

Operation of this IC card is explained next by way concurrently of the flow chart of FIG. 10 and an example of display sequence shown in Table 1. When the power switch 57 is pressed, the control system is initialized (n21) and "0" is displayed in the display section 42 (Line 1 of Table 1). If 4 decimal digits of a password are not received yet (NO in n22), a password is entered one binary digit at a time (n23). Suppose a password "2138" in decimal is to be entered. The first decimal number "2" is "0010" by binary representation. Thus, the "0"-key 51 and the "1"-key 52 are used successively to enter "0010" indicative of the decimal number "2". When this is done, this series of binary numbers is stored in the binary register 45 and is displayed as "0010" in the right-hand 4 digits of the display section 42 (Line 2 of Table 1) through the display register 46, the AND gate 48 and the OR gate 49 (n24). If the conversion key 53 is pressed (YES in n26) after 4 binary numbers are thus entered (YES in n25), the binary number "0010" entered in Steps n23–n25 is converted into a decimal number "2" (n27) and this decimal number is displayed through the shift register 63 in the area of the left-hand 4 digits of the display section 42 (n28). Since the binary register 45 is cleared at this moment, "0" is displayed at the right-hand end of the display section 42 (Line 3 of Table 1). Thereafter, a similar sequence is repeated for the succeeding digits (n29). To enter a password "2138", the next step is to enter "0001" (binary form of decimal "1") and it is displayed (Line 4 of Table 1). If the conversion key 53 is pressed thereafter, "1" which is the decimal equivalent of binary "0001" is displayed after the decimal "2" which was previously entered, "0" appearing again on the right-hand side as explained above (Line 5 of Table 1). Similarly, "0011" is entered for "3" (Line 6 of Table 1) and "213" is displayed on the left-hand side (Line 7 of Table 1). Finally, "1000" is entered for "8" (Line 8 of Table 1) and "2138" is displayed on the left-hand side (Line 9 of Table 1). After a decimal password with 4 digits has been entered (YES in n22), if the match key 56 is pressed (n30), the password thus entered is compared with the preliminarily stored password and if they match, the AND gate 68 causes the RS flip-flop 47 to transmit a reset signal, displaying the content of the display register 64 ("2138") on the right-hand side of the display section 42 through the AND gate 69 and, one second later, "PASSWORD OK" (Line 10 of Table 1) or any predefined message.

TABLE 1

| Step | Key Input | Display | |
|------|-----------|---------|---|
| 1 | "ON/C" | | 0 |
| 2 | "0", "0", "1", "0" | | 0010 |
| 3 | "CONV" | 2 | 0 |
| 4 | "0", "0", "0", "1" | | 0001 |
| 5 | "CONV" | 21 | 0 |
| 6 | "0", "0", "1", "1" | | 0011 |
| 7 | "CONV" | 213 | 0 |
| 8 | "1", "0", "0", "0" | | 1000 |
| 9 | "CONV" | 2138 | 0 |
| 10 | "MATCH" | | 2138 |
| | | PASSWORD OK | |

According to this embodiment of the present invention, in summary, passwords can be entered by way of two binary numbers "0" and "1". Thus, the number of keys required on the card can be reduced and the main objects of the present invention are achieved.

Still another aspect of the present invention relates to the structure of a display section of an IC card such as the one shown in FIG. 2. FIG. 11 is a plan view of such a display section 82 comprising a liquid crystal cell, characterized as having groups of dot segments 84 (each with 5×7 dots for displaying a numeral 0–9) and rectangular cursor indicators 85a, 85b, . . . 85j respectively below a series of printed numerals 9, 8, . . . 0. The printed numerals are for indicating numerals which are selected when a password is selected. If the password is in the form of a character array, characters should be written instead of numerals above the cursor indicators and the total number of the cursor indicators may be appropriately selected. In FIG. 11, the rectangles drawn by broken lines inside the cursor indicators indicate solar batteries which are smaller than the cursor indicators. These solar batteries are disposed on the back surface (the display surface being the front surface) of the display section 82 and corresponding to the individual cursor indicators 85a . . . 85j. With reference to FIG. 12 which is a sectional view of a part of the display section 82 of FIG. 11 to show its structure, the display section 82 is essentially comprised of a liquid crystal cell with two mutually opposite transparent film-like electrode plates 92a and 92b, the electrode plate 92a facing the front. Solar batteries 96 (only one shown in FIG. 12) are attached to the back electrode plate 92b as explained above. Numeral 97 indicates a connector with conductive and non-conductive layers formed alternately. Numeral 98 indicates a printed circuit board. The front electrode plate 92a is somewhat longer than and extends over the back electrode plate 92b, and a connecting electrode (not shown) is printed on the extended portion of the front electrode plate 92a. This connecting electrode is electrically connected to the printed circuit board 98 through the connector 97.

FIG. 13 is a block diagram of an IC card as shown in FIG. 2 incorporating a display section 92 of the type described above by way of FIGS. 11 and 12. Thus, the numerals explained above indicate the same corresponding components such as the power key 23a of FIG. 2 and the cursor indicators 85a, ... 85j of FIG. 11. Numeral 99 indicates an LSI circuit including memory means storing a password as well as a central processing unit for carrying out various operations in response to input signals from the input key section 23. Let us assume that "2138" is the password stored in the LSI circuit 99.

When an operator initially presses the power key 23a, intending to enter "2183" correctly as the password, the LSI circuit 99 causes "0" to be displayed in the display section 82 as shown in FIG. 14(a). When the cursor key 23b is pressed next, the LSI circuit 99 transmits a cursor control signal A to the display section 82 to light up (to make black) the cursor indicators 85a, ... 85j sequentially one at a time, thereby moving the cursor in the display section 82. FIG. 14(b) shows how the display section 82 looks when the cursor moves to "2", that is, when the cursor indicator 85h corresponding to the printed numeral "2" lights up (becomes black).

Corresponding to the cursor indicators 85a, ... 85j and individually behind them are solar batteries 96a, ... 96j such that external light P incident on the front surface of the display section 82 reaches the solar batteries 96a, ... 96j if the cursor indicators 85a, ... 85j are all clear (not black). In the situation depicted by FIG. 14(b), however, light does not reach the solar battery 96h behind the cursor indicator 85h corresponding to the printed numeral "2". This solar battery 96h is thereby placed in the "Low" condition while all the other batteries remain in "High" conditions.

When the operator presses the lock key 23c thereafter, "2" appears in the display section 82 as shown in FIG. 14(c). As shown in FIG. 13, each solar battery 96 is connected through an inverter to an input terminal of an AND gate 100 and its other input terminal is connected to the lock key 23c. Thus, the AND gate 100h for taking the logical product of the inverted output from the solar battery 96h in the "Low" condition and the input signal from the aforementioned lock key 23c transmits an output signal. By contrast, the remaining AND gates (100a-100g, 100i and 100j) transmit no signal to the LSI circuit 99 although they, too, receive the input signal from the lock key 23c because light P is incident on their corresponding solar batteries (96a-96g, 96i and 96j).

When the LSI circuit 99 receives the output signal from the AND gate 100h, it transmits a dot control signal B, causing the numeral "2" to appear in the display section 82 as explained above in connection with FIG. 14(c).

Similarly, the operator can enter the desired password "2138" one digit at a time by pressing the cursor and lock keys 23b and 23c alternately (FIG. 14(d)–FIG. 14(i)). If the operator presses the match key 23e after all four digits of the desired password are displayed, a message such as "PASSWORD OK" is displayed as shown in FIG. 14(j) because the password which has just been entered and displayed in FIG. 14(i) coincides with the originally stored password, that is, the operator has entered the correct password. If a wrong password is entered and the match key 23e is pressed, such a message is not displayed in the display section 82.

As shown in FIG. 15, the LSI circuit 99 includes a central processing unit (CPU) 101 which serves to receive key input signals and aforementioned output signals from the AND gates 100a-100j and also to transmit various control signals to the display section 82. Numeral 102 indicates a memory device storing a password ("2138" in the above example) and the numeral "10". Numerals 103 and 104 indicate a counter and a register for storing a 4-digit number connected to the CPU 101, respectively. When a power-on signal C from the power key 23a is received by the CPU 101, both the counter 103 and the register 104 are cleared. Thereafter, every time the CPU 101 receives a signal from the cursor key 23b, the content of the counter 103 is increased by 1. The number counted by the counter 103 is used for selecting one of the rectangular cursor indicators 85a, ... 85j to make it black. After it is codified, it is transmitted as the aforementioned control signal A. When the counted number in the counter 103 reaches 10, that is, when it becomes equal to the number "10" stored in the memory device 102, the CPU 101 operates to clear the counter 103, causing the counted number to become "0" again.

If the lock key 23c is pressed and the CPU 101 receives a lock signal D, the CPU 101 causes the counted value in the counter 103 to become stored in the register 104 and transmits another control signal B to cause the display section 82 to display the content of the register 104. The register stores a 4-digit number sequentially one digit at a time from the lowest digit. If a match signal E is received thereafter, the CPU 101 compares the password stored in the memory device 102 with the content stored in the register 104, examining whether a correct password has been entered.

The foregoing description of preferred embodiments of the present invention has been presented for purposes of illustration and description. It is not intended to be exhaustive or to limit the invention to the precise form disclosed, and many modifications and variations are possible in light of the above teaching. For example, although a cursor in the above example was used as a shutter to cut off the incidence of external light, an IC card of the present invention may be alternatively be so designed that data entered from an external apparatus are converted first into optical signals and that the aforementioned solar batteries are used to read these optical signals. The display section 82 may not necessarily be comprised of a liquid crystal cell and the cursor may be substituted by any other appropriate mark. Any modifications and variations that may be apparent to a person skilled in the art are intended to be included within the scope of this invention.

What is claimed is:

1. An IC card comprising
a display means, a display control means for causing symbols and a cursor to be displayed in said display means, a cursor motion input means for specifying motion of said cursor displayed in said display means, a cursor moving means for causing said cursor to move to a position corresponding to a specified symbol in response to an input through said cursor motion input means, a lock input means for specifying one of said symbols displayed in said display means, and a locking means for keeping said cursor at a position corresponding to said one of said symbols specified by said lock input means in response to an input through said lock input means.

2. The IC card of claim 1 wherein said symbols are numerals.

3. The IC card of claim 1 further comprising
memory means storing a password, and
comparing means for comparing an entered symbol array with said password,
said locking means serving to transmit said specified symbol to said comparing means.

4. In an IC card having a display means, a memory means and a preregistered password such that the content of said memory means can be displayed in said display means if a received password coincides with said preregistered password, the improvement wherein said IC card further comprises
key input means for entering binary number data including binary numbers "0" and "1",
conversion input means,
conversion means for converting binary data entered by said key input means into decimal data in response to an input from said conversion input means,
storing means for storing decimal data obtained through conversion of binary data through said conversion means,
comparison means for making a comparison between the content of said storing means and said preregistered password, and
display control means for displaying the content of said storing means in said display means if said comparison results in agreement.

5. The IC card of claim 4 wherein said storing means comprises a shift register.

6. The IC card of claim 4 wherein said comparison means comprises a central processing unit.

7. In an IC card provided with a display means which includes a transparent display panel having a back surface and is adapted to move a non-transparent indicator mark, the improvement wherein said IC card comprises
solar batteries disposed on said back surface at individual predetermined positions and intended to be indicated by said indicator mark,
said IC card being adapted to receive data by placing said mark at one of said individual positions and causing said mark to thereby prevent external incident light from reaching the one of said solar batteries corresponding to said one of said positions.

8. The IC card of claim 7 wherein said display means comprises a liquid crystal cell.

9. The IC card of claim 7 wherein said mark is a cursor.

* * * * *